April 2, 1946.  E. W. CHAFEE  2,397,532
RANGE FINDER
Original Filed June 3, 1938
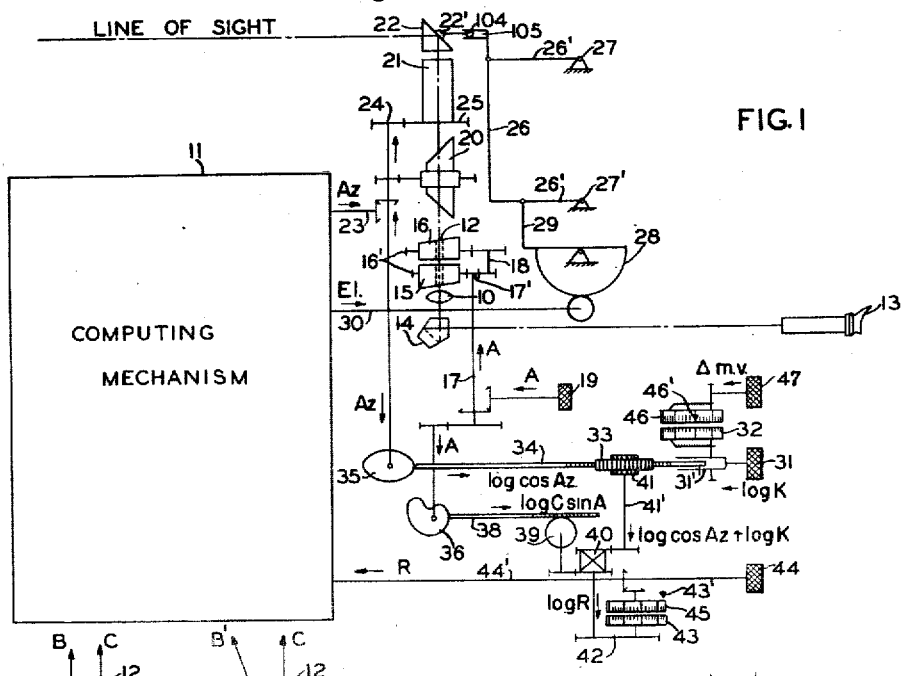
FIG. 1
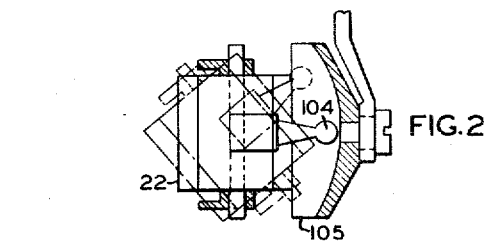
FIG. 3A  FIG. 3B  FIG. 4
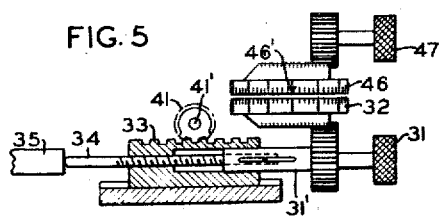
FIG. 2
FIG. 5
INVENTOR
E. W. CHAFEE
BY
Herbert H. Thompson
his ATTORNEY.

Patented Apr. 2, 1946

2,397,532

UNITED STATES PATENT OFFICE 2,397,532

RANGE FINDER

Earl W. Chafee, New York, N. Y., assignor to Sperry Gyroscope Company, Inc., Brooklyn, N. Y., a corporation of New York Original application June 3, 1938, Serial No. 211,550. Divided and this application April 2, 1943, Serial No. 481,636

8 Claims. (Cl. 88—2.2)

This invention relates to range finders of the type ordinarily employed in inter-aircraft fire control systems, although the invention may have general application wherever it is desired to determine the distance to an object having a known lateral dimension. This application constitutes a division of copending application Serial No. 211,550, entitled "Fire control system for aircraft guns," filed June 3, 1938, in the name of Earl W. Chafee.

In such fire control systems the line of sight defined by the optical system and the range finder is oriented toward the target in elevation and azimuth either from a manually operated control or from a suitable computing mechanism. Having been thus oriented, and having received data corresponding to an assumed target dimension, the range finder then computes data indicative of the slant range to the target and introduces this data into the computing mechanism for further calculations.

It is the primary purpose of this invention to provide improved and more accurate range finder means for accomplishing this result. Other objects and advantages will become apparent from the specification taken in connection with the accompanying drawing wherein the invention is embodied in concrete form.

In the drawing:

Fig. 1 is a schematic representation of the improved range finder of the present invention.

Fig. 2 is a detail of the mechanism for rotating in elevation the line of sight defined by the range finder.

Figs. 3A and 3B are diagrams illustrating the passage of light rays through a portion of the optical system of the range finder.

Fig. 4 is a diagram showing the principles of operation of the invention, and

Fig. 5 is a detail of the range computing mechanism.

Similar characters of reference are used in all of the above figures to indicate corresponding parts. Arrows are employed to indicate the direction of flow of information or control influence.

Referring now to Fig. 1, the line of sight enters the eye piece 13 and passes horizontally through the pentaprism 14 and thence vertically through the lens 10 and a pair of reversely rotated wedge-shaped prisms 15 and 16. Said wedge prisms are oppositely turned by being mounted in annular gears 16' rotated from shaft 17, pinion 17' and reversing gearing 18, shaft 17 being turned from the knob 19. After passing through the wedge-shaped prisms the line of sight passes through a rotatable erecting prism 20, telescope tube 21 and angularly tiltable prisms 22, whence the line of sight emerges laterally toward the target.

The line of sight is represented as rotatable in azimuth from shaft 23, illustrated in this case as emerging from the computing mechanism 11. Shaft 23 turns the assembly on which prism 22 is mounted through pinion 24 and gear 25. The line of sight is tiltable in elevation by means of a rod 26 pivoted to datum at 27, 27' through parallel links 26' and movable up and down from segmental gear 28 through line 29. Said gear in turn is rocked in elevation from shaft 30 which emerges from computing mechanism 11. The motion of rod 26 is communicated to prism 22 through an arcuately grooved guide 105 carried by said rod and a ball ended arm extension 104 movable in said guide, whereby the up and down movement of rod 26 rocks the prism 22 about a transverse axis 22' to give the line of sight the proper elevation movement for all positions of the prism in azimuth (see Fig. 2).

The wedge prisms 15 and 16 are used in finding the slant range of the target. They are circular glass discs which may have their inward faces parallel and their outer faces inclined thereto at a small angle and which can be rotated in opposite directions by the above-described gearing 16', 17', 18 and knob 19. This arrangement makes the two wedges optically act as one single wedge with the wedge angle variable from zero to a maximum, the resultant wedge angle being proportional to the sine of the angle A through which the wedges are turned.

Fig. 3A shows the wedges with their inclined outer faces parallel. In this position the bending of a light ray by one wedge is neutralized by the bending in the opposite direction by the other wedge so that the emerging and entering paths are parallel. B represents such a ray, the slight offset which occurs in passage through the double wedge not being shown. The position of the wedges indicated in Fig. 3A is referred to as their neutral position. When the two wedges are rotated 90° in opposite directions, producing a relative rotation of 180°, they are positioned as shown in Fig. 3B. A ray B' is then bent in the same direction by the two wedges making a maximum angle of deviation from its original path. Intermediate positions of the two wedges will obviously cause an intermediate amount of bending of ray B'.

The wedges both have a round hole 12 in their center so that about one-half of all the light rays entering the wedge area will go through the hole 12 without deflection, as illustrated by ray C in Figs. 3A and 3B. The balance of the rays pass through the wedge proper and are deflected as described above. A person looking through the eye piece will hence see two images of the target, one direct image $a$ and one deflected image $b$, as shown in Fig. 4. Image $b$ will be shifted to one side of the direct image $a$ in all cases except where the two wedges are in their exact neutral position, that is, oppositely positioned, and the angular distance through which the images are shifted depends on the rotary position or angle A that the two wedges make with respect to each other. In the said neutral position which is reached by turning the wedge adjusting knob 19 until both images merge into one, this angle is zero. In operation by a suitable adjustment of knob 19 the deflected image of the target is brought into a position where its wing tip just touches that of the direct image, as shown at $b'$.

In the triangle thus set up, it is obvious that (1) $$\tan \beta = \frac{K}{R}$$

in which $\beta$ is the angle between the direct and refracted lines of sight (B' and C of Fig. 3B), R is the slant image, and K is the actual wing spread of the target, since for the condition illustrated in Fig. 4 with the target flying in the direction of the line of sight, the distance between the centers of the two images will be proportional to the wing spread. Since K is known from the type of bomber being attacked, and since $\beta$ may be determined from the setting of the wedges, the slant range can thus be obtained, being $$R = \frac{K}{\tan \beta}$$

or, for the very small values of $\beta$ here encountered, (2) $$R = \frac{K}{\beta}$$

The angle $\beta$ is moreover proportional to the sine of the angle A through which the wedges are turned or, (3) $$\beta = C \sin A$$

where C is a constant. Hence, we may write (4) $$R = \frac{K}{C \sin A}$$

This condition of course only holds true where the target is directly ahead and the attacking craft is flying a parallel course. In case it is not directly ahead, the wing spread will be foreshortened which may be taken into account by introducing the azimuth angle Az which the line of sight makes with the fore and aft axis of the attacking craft, so that the equation may be written (5) $$R = \frac{K \cos Az}{C \sin A}$$

The above introduction of the azimuth angle Az is strictly true only when the attacking plane flies a course parallel to the target. However, since the departure from parallel course, when it occurs, is normally small, and the corresponding variation of cos Az is still smaller, this small error in range, which effects only a correction factor, is neglected in view of the more complicated mechanism required for an exact solution under all conditions.

In my sight I prefer to solve Equation 5 in its logarithm form which may be written:

(6) log $R$ = log $K$ + log cos $Az$ — log ($C$ sin $A$)

Log K is set in by turning knob 31 until the index 46' reads the correct value for the wing spread K on the logarithmic dial 32. As shown more clearly in Fig. 5, turning knob 31 also rotates a cylinder 31' which then rotates a cam pinion 34 which is threaded through a rack bar 33 and also spring pressed against a cam 35. Cylinder 31' is slotted to permit axial translation of cam pin 34 with respect to it. The position of bar 33 is therefore the algebraic sum of the lift of pin 34 and the rotation of knob 31. Log cos Az is the lift of said cam pin 34 governed from the cam 35 which cam is rotated in accordance with the azimuth angle Az from shaft 23. Therefore, the total motion of rack bar 33 represents log K + log cos Az.

Log C sin A is represented by the lift value of the cam 36 which is rotated in accordance with the angle A between the wedges from knob 19. Cam pin 38 carries rack teeth which rotate through pinion 39 one arm of a subtracting differential 40. The second arm is rotated from rack 33 through pinion 41 and shaft 41'. The third arm of said differential therefore rotates through gears 42 a logarithmic range dial 43 by an amount proportional to log R in accordance with the aforesaid Equation 6.

The range may therefore be set into the computing mechanism 11 as a proportional rotation of shaft 44' either through a power follow-up mechanism or from a handle 44 which turns the dial 45 to match the reading of a fixed index 43'.

If desired, an extra dial 46 together with knob 47 may be provided, operating in conjunction with the dial 32, for compensating for changes in the muzzle velocity of the gun. Variations in muzzle velocity (Δ M. V.) may then be taken care of by introducing a corresponding correction in range by turning knob 47, thereby shifting the reference index 46' for dial 32.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A range finder adapted to be used in connection with a computing mechanism for fire control comprising compensating means for approximately correcting for a foreshortened view of a target controlled by the orientation in azimuth of the range finder when tracking a target, an optical system in said range finder including a member adjustable to determine an angle at said range finder equivalent to that subtended by a known dimension of the target and means jointly controlled by the first mentioned means and said member for registering the approximate range of the target.

2. A range finder adapted to be used in connection with a computing mechanism for fire control comprising means for approximately correcting for a foreshortened view of the target so coupled with the range finder as to be displaced therewith as the target is being tracked in azimuth, an optical system in said range finder including a member adjustable to measure the angle at said finder subtended by a known dimension of the target, a differential mechanism having one input operated by the first mentioned means, a second input connected to said member so as to be moved in proportion to the adjustment of said member whereby the output of said differential is displaced in proportion to the approximate range of the target.

3. A range finder adapted to be used in connection with a computing mechanism for fire control comprising means for approximately correcting for a foreshortened view of the target so coupled with the range finder as to be displaced therewith as the target is being tracked in azimuth, an optical system in said range finder including a member adjustable to measure the angle at said finder subtended by a target, means in said range finder adapted to be set according to a known dimension of the target, a differential having one input adapted to be moved jointly by the first and last mentioned means and another input connected to said member so as to be moved in proportion to the adjustment of said member whereby the output of the differential registers a range component of the target.

4. A range finder according to claim 1 in which the optical system comprises a pair of prisms and in which said member is adapted when adjusted to produce relative movement of the prisms.

5. A range finder according to claim 1 in which the optical system comprises a pair of rotatable complementary prisms and in which said member is adapted when adjusted to cause the relative rotation of the prisms.

6. A range finder according to claim 1 in which the optical system comprises a pair of rotatable complementary prisms having coaxially disposed aligned holes therethrough whereby two images of the target may be seen, one directly through said openings and the other through the prisms, and wherein said member is adapted when moved to cause the relative rotation of said prisms thereby varying the relative position of said images.

7. A range finder according to claim 1 in which the optical system comprises a pair of rotatable complementary prisms having coaxially disposed aligned holes therethrough, and in which said member is coupled to said prisms so as to cause when adjusted the relative rotation thereof, the target as viewed through said holes forming a fixed reference for a movable image of the target seen through said prisms, said image being displaced with respect to the fixed reference to an extent governed by the relative position of the prisms.

8. A range finder adapted to be used in connection with a computing mechanism for fire control comprising means for approximately correcting for a foreshortened view of the target so coupled with the range finder as to be displaced therewith as the target is being tracked in azimuth, an optical system in said range finder including a member adjustable to measure the angle at said finder subtended by a target, a differential having one input operated by the first mentioned means, a second input connected to said member so as to be moved thereby in proportion to the adjustment thereof, means for adjusting one of said inputs according to a ballistic component, means in said range finder adapted to be set according to a known dimension of the target, means coupling the last mentioned means to one of the inputs of said differential, whereby the output of the differential is adjusted in proportion to the range of the target.

EARL W. CHAFEE.

Certificate of Correction

Patent No. 2,397,532. April 2, 1946.

EARL W. CHAFEE

It is hereby certified that errors appear in the printed specification of the above numbered patent requiring correction as follows: Page 1, first column, line 29, for "Iin" read *In*; page 2, first column, line 29, for "image" read *range*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.* sion of the target, a differential mechanism having one input operated by the first mentioned means, a second input connected to said member so as to be moved in proportion to the adjustment of said member whereby the output of said differential is displaced in proportion to the approximate range of the target.

3. A range finder adapted to be used in connection with a computing mechanism for fire control comprising means for approximately correcting for a foreshortened view of the target so coupled with the range finder as to be displaced therewith as the target is being tracked in azimuth, an optical system in said range finder including a member adjustable to measure the angle at said finder subtended by a target, means in said range finder adapted to be set according to a known dimension of the target, a differential having one input adapted to be moved jointly by the first and last mentioned means and another input connected to said member so as to be moved in proportion to the adjustment of said member whereby the output of the differential registers a range component of the target.

4. A range finder according to claim 1 in which the optical system comprises a pair of prisms and in which said member is adapted when adjusted to produce relative movement of the prisms.

5. A range finder according to claim 1 in which the optical system comprises a pair of rotatable complementary prisms and in which said member is adapted when adjusted to cause the relative rotation of the prisms.

6. A range finder according to claim 1 in which the optical system comprises a pair of rotatable complementary prisms having coaxially disposed aligned holes therethrough whereby two images of the target may be seen, one directly through said openings and the other through the prisms, and wherein said member is adapted when moved to cause the relative rotation of said prisms thereby varying the relative position of said images.

7. A range finder according to claim 1 in which the optical system comprises a pair of rotatable complementary prisms having coaxially disposed aligned holes therethrough, and in which said member is coupled to said prisms so as to cause when adjusted the relative rotation thereof, the target as viewed through said holes forming a fixed reference for a movable image of the target seen through said prisms, said image being displaced with respect to the fixed reference to an extent governed by the relative position of the prisms.

8. A range finder adapted to be used in connection with a computing mechanism for fire control comprising means for approximately correcting for a foreshortened view of the target so coupled with the range finder as to be displaced therewith as the target is being tracked in azimuth, an optical system in said range finder including a member adjustable to measure the angle at said finder subtended by a target, a differential having one input operated by the first mentioned means, a second input connected to said member so as to be moved thereby in proportion to the adjustment thereof, means for adjusting one of said inputs according to a ballistic component, means in said range finder adapted to be set according to a known dimension of the target, means coupling the last mentioned means to one of the inputs of said differential, whereby the output of the differential is adjusted in proportion to the range of the target.

EARL W. CHAFEE.

Certificate of Correction

Patent No. 2,397,532. April 2, 1946.

EARL W. CHAFEE

It is hereby certified that errors appear in the printed specification of the above numbered patent requiring correction as follows: Page 1, first column, line 29, for "Iin" read *In*; page 2, first column, line 29, for "image" read *range*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.*